United States Patent Office 3,594,452
Patented July 20, 1971

---

3,594,452
POLYMERS PREPARED FROM MONOLITHIUM-TERMINATED BLOCK COPOLYMERS AND CERTAIN DIESTERS
Harold E. De La Mare, El Cerrito, and Edwin F. Bullard, Oakland, Calif., assignors to Shell Oil Company, New York, N.Y.
No Drawing. Filed Feb. 6, 1968, Ser. No. 703,239
Int. Cl. C08f 15/14, 27/00
U.S. Cl. 260—880                                       7 Claims

ABSTRACT OF THE DISCLOSURE

Block polymers of high molecular weight result from the reaction of styrene-butadiene block copolymers terminated with lithium radicals and diesters of dicarboxylic acids in which each of the two carboxyl radicals is directly attached to a carbon atom and monohydric alcohols.

BACKGROUND OF THE INVENTION

Block copolymers of an increasing variety have been studied within relatively recent years. These may have as few as two polymer blocks and up to a substantial number of blocks alternating in their chemical characteristic. A special class of block copolymers having particularly interesting properties indicating substantial commercial promise comprise those polymers in which monovinyl arene polymer blocks alternate with conjugated diene polymer blocks, particularly if the arrangement and proportion of the blocks is such as to produce a block copolymer which does not require later vulcanizing treatments. The overall combination of physical properties will resemble those of either and elastomer or of a thermoplastic resin, depending on the exact identity and proportion of the polymer blocks present. A typical thermoplastic elastomer, for example, is one having the general construction polystyrene-polybutadiene-polystyrene particularly when the proportion of condensed polystyrene is in the order of 15–50% by weight of the whole block polymer.

Certain difficulties are encountered in the production of such polymers and moreover once they are produced a deficiency in their physical properties at elevated temperatures has been encountered. It would be especially desirable to improve the tensile strength, elongation and set properties of such polymers at elevated temperatures while still maintaining the excellent set of properties noted at ordinary ambient temperatures.

A number of attempts have been made to increase the average molecular weight of block polymers by so-called coupling reactions and related procedures. Coupling is normally effected by reaction of a polymer chain having a reactive end group with another chain having the same or a coreacting end group. Where two reactive end groups are identical it has been necessary to employ an extraneous coupling agent, such as a dihalohydrocarbon compound. While this causes a doubling of the average molecular weight if carried out correctly, the process in the past has been limited when only two reactive end groups or two coupling agent sites are employed. Other attempts have been made to cause what amounts to grafting reactions utilizing a variety of techniques and reagents but resulting in what, for most part, appear to be poorly defined graft polymers although they have been referred to among other terms as "radical polymers." Among the reagents suggested for this purpose have been glycerides such as glycerol tristearate or glycerol trioleate. However, according to the latest findings these reagents actually do not result in anything more than dimers of the actively terminated starting polymers apparently due to the fact that the glycerides are esters in which the ester radical is connected to the carbon chain through oxygen-to-carbon bonds and not carbon-to-carbon bonds. The chemistry involved results in cleavage of the products in such a way that no more than dimers of the starting polymers result.

It is an object of the present invention to improve the physical properties of block polymers. It is a specific object of the invention to improve the physical properties of block copolymers at elevated temperatures. It is also a specific object of the invention to improve the physical properties of block copolymers at elevated temperatures without losing the ease of processing of such polymers. It is a further object of the invention to provide a process for the production of polymers having at least three times the average molecular weight of the starting polymers utilized in their production. Other objects will become apparent during the following detailed description of the invention.

STATEMENT OF THE INVENTION

Now, in accordance with the present invention, a process is provided for the preparation of a polymer composition predominating in species having at least three times the average molecular weight of the starting polymer which comprises block polymerizing a monovinyl arene with a conjugated diene utilizing an organo monolithium initiator and then reacting the resulting monolithium terminated starting polymer with from about 0.25 to 5 mols of a diester per lithium radical, said diester being one formed between a dicarboxylic acid and a monohydric alcohol.

The resulting product of the complex reaction thereby effected is one which predominates in trimers and tetramers of the starting block copolymer. The basic reactions involved in this process are believed to be as follows:

Trimer (SB)₃

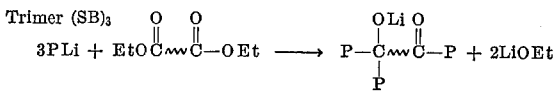

Tetramer (SB)₄

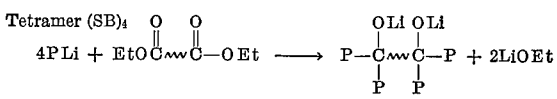

In the above equations the term Et is meant to represent an ethyl radical while the leter P represents a block polymer, in this case the starting block polymer of a monovinyl and a conjugated diene. Therefore, the term PLi represents a monolithium terminated block copolymer. It will be noted from the above equations that the use of the subject class of diesters permits the formation of condensed products having the form of either trimers or tetramers of the starting block polymer. This is in direct contrast to the results which would be obtained if an ester of a monocarboxylic acid and a polyhydric alcohol were utilized in place of the class forming the important aspect of this invention.

The condensed polymers prepared by the process of this invention have been found to have substantially improved physical properties at elevated temperatures. Furthermore, they have been found to exhibit a reduced tendency to shrink or warp under hot conditions. The molecular weight of the predominating species in the reaction product has been found to be at least three and sometimes four times as high as the average molecular weight of the starting polymer species.

The starting polymers from which the final products are made have the general configuration $(A\text{–}B)_n/Li$ in which A represents a polymer block of a monovinyl arene, B is a polymer block of a conjugated diene and $n$ is a whole integer between 1 and 8. Preferably, the condensed monovinyl arene content comprises 15–65% by weight of the starting polymer, and each block A has an average molecular weight between about 7,500 and 50,000. Normally, the starting polymers will be those having the structure A—B—Li in which the monovinyl arene polymer block will be polystyrene having an average molecular weight of between about 9,000 and 30,000, the block A comprising about 20–55% by weight of the starting polymer. Other monovinyl arenes may be utilized such as alpha-methyl styrene and mixtures thereof with styrene. The conjugated diene polymer block is derived by polymerization of conjugated dienes preferably having 4–8 carbon atoms per molecule, particularly butadiene, isoprene and mixtures thereof. However, the block B which is characterized by its elastomeric character may also be a random copolymer of a conjugated diene with a monovinyl arene as long as the proportions are such that an elastomeric block is created. Usually this will be one in which the monovinyl arene condensed units are present in a minor proportion, below about 50% by weight.

The starting polymers are preferably prepared in an inert hydrocarbon medium such as an aromatic or naphthenic hydrocarbon, e.g., benzene or cyclohexane, which may be modified by the presence of an alkene or alkane such as pentenes or pentanes, the block copolymers being formed by the use of an organo monolithium initiator such as a lithium alkyl. Secondary butyl lithium is preferred for this purpose although other alkyl lithium catalysts may be used in which the alkyl radical has from 1 to 8 carbon atoms. The methods of making such block copolymers are known in the art and generally comprise the formation of a solution of the initiator to which is added the first monomer, namely, the monovinyl arene in such proportions that a polymer block of the desired average molecular weight is formed and then without terminating the polymer introducing the second monomer, namely, a conjugated diene to form the polymer block B. The process is characterized by the growing polymer chain being terminated on one end with a lithium radical. Thus, at the end of the polymerization and in its simplest form utilizing the preferred monomers the starting block coploymer would have the configuration polystyrene-polybutadiene-lithium. This is the starting polymer which is then reacted with a diester of a monohydric alcohol and a dibasic carboxylic acid.

It is stressed that the diesters which are operable in the present process must be those in which the carboxyl radicals of the acid from which the ester is made are directly attached to a carbon atom; preferably the two carboxyls are connected by carbon-to-carbon bonds only and no carbon-to-oxygen bonds are present in these connecting links. However, the acids may contain heteroatoms such as oxygen nitrogen or sulfur, replacing carbon atoms in the chain. The following lists of aliphatic acids illustrates the dicarboxylic acids which may be used for the formation of suitable esters.

Aliphatic acids

| | |
|---|---|
| Oxalic | Maleic |
| Malonic | Fumaric |
| Succinic | Glutaric |
| Adipic | Pimelic |
| Suberic | Sebacic |
| Itaconic | |

The following list of aromatic acids illustrate the type of dicarboxylic acids which may be employed for forming suitable esters:

Aromatic acids

| | |
|---|---|
| Phthalic | Isophthalic |
| Terephthalic | Naphthalic |
| Diphenic | |

Esters of the above types of dicarboxylic acids may be formed from either aliphatic or aromatic monohydric alcohols of which the following are typical:

Monhydric alcohols

| | |
|---|---|
| Methyl | Ethyl |
| n-Propyl | Isopropyl |
| n-Butyl | sec-Butyl |
| tert.-Butyl | Amyl |
| Hexyl | Octyl |
| Phenol | Cresol |

The esters may bear alkyl or aryl substituents without altering the nature of the present invention. The following esters are typical of those prepared from the above types of acids and esters:

Esters

| | |
|---|---|
| Dimethyl oxalate | Diethyl oxalate |
| Dipropyl malonate | Dibutyl glutarate |
| Dihexyl pimelate | Dimethyl adipate |
| Diethyl adipate | Dioctyl sebacate |
| Dimethyl phthalate | Diethyl terephthalate |

The reaction between the subject class of diesters and the starting block copolymers described above may be carried out in the same reaction medium in which the lithium terminated starting block copolymers were prepared, or alternatively, the solution thus prepared may be added to another vessel containing a dispersion of the diesters. Reaction is apparently essentially instantaneous but will depend in part upon the temperature, which is preferably between about 20 and 80° C., still more preferably 25–75° C. The reaction mixture usually is held only momentarily or for periods up to four hours. Preferred reaction periods are between 10 minutes and 1 hour. The process may be carried out in a batch manner or continuously. Following the reaction, the product is neutralized such as by the addition of water, alcohol or other reagents for the purpose of removing the lithium radical present on the acid residue forming the nucleus for the condensed polymer product. The product is then recovered such as by coagulation utilizing hot water or steam or both to recover a polymer product having substantially increased average molecular weight, the predominant species present having an average molecular weight, of at least 3 and usually 3–4 times that of the starting block copolymer.

The following examples illustrate specific embodiments of the present invention.

EXAMPLE I

A starting block copolymer was prepared in cyclohexane solvent utilizing secondary butyl lithium as the initiator and first polymerizing styrene to form a first polystyrene block and thereafter injecting butadiene to form a polybutadiene block, the living block copolymer so formed then having the structure polystyrene-polybutadiene-lithium. It was determined that this starting block copolymer had average molecular weights in the polystyrene block of about 14,000 and that the polybutadiene block had an average molecular weight of about 37,000. Diethyl adipate was added to the solution so formed in an amount of 0.25 mol of diethyl adipate per lithium radical present.

The product on analysis was found to contain about 16% by weight of essentially unaltered polystyrene-polybutadiene starting polymer, 56% by weight of a trimer of the starting polymer and 28% by weight of a tetramer of the starting polymer. Thus it is indicated that essentially 84% of the starting block copolymer took part in the condensation reaction. It was found that the reaction was essentially complete in at least 30 minutes over a temperature range between about 25 and 70° C.

The conditions were varied in subsequent experiments to determine the effect of adding a variety of ratios of diester to the starting block copolymer. The table which follows indicates that there is no powerful controlling effect of either temperature or proportion of diester which causes the formation of trimers or tetramers of the starting block copolymer. A reaction time of 2.5 hours was used in all cases.

TABLE I

[Preparation of (SB)ₓ using diethyladipate and dibromoethane as coupling agents]

| | Tempera- ture, °C. | Coupled with ester, equivalent/ RLi | Species, weight percent | | | |
|---|---|---|---|---|---|---|
| | | | SB | (SB)₂ | (SB)₃ | (SB)₄ |
| Reaction: | | | | | | |
| 1 | 70 | 1.0 | 15.9 | -------- | 56.6 | 27.6 |
| 2 | 25 | 2.0 | 21.8 | -------- | 42.5 | 35.8 |
| 3 | 70 | 2.0 | 19.0 | -------- | 53.6 | 27.4 |
| 4 | 25 | 20.0 | 18.3 | -------- | 50.9 | 30.8 |

A parallel experiment utilizing the starting copolymer polystyrene-polybutadiene-lithium and coupling with dibromoethane resulted in a product containing about 21% of the starting copolymer, 62% of a dimer thereof and only about 17% of a trimer. This indicates clearly the striking and unexpected difference between dihalohydrocarbons as coupling agents and the use of subject classes of diesters as condensation agents when the same starting block copolymer is employed.

EXAMPLE II

Comparative physical testing was made on the samples described in the previous example together with the coupled product produced by the use of dibromoethanes starting with the same two-block copolymer. The following table shows the results obtained in this comparison.

TABLE II

| Property | Coupling agent | | | | |
|---|---|---|---|---|---|
| | Dibromo- ethane | 1 | 2 | 3 | 4 |
| Tensile strength (lbs./ square inch ²) at— | | | | | |
| 25° C. | 4,675 | 3,950 | 3,350 | 4,550 | 4,300 |
| 70° C. | 300 | 565 | 490 | 565 | 500 |
| Modulus 300% (lbs./ square inch ²) at— | | | | | |
| 25° C. | 280 | 290 | 280 | 280 | 290 |
| 70° C. | 210 | 245 | 230 | 235 | 240 |
| Elongation at break (percent) at— | | | | | |
| 25° C. | 1,000 | 900 | 850 | 850 | 900 |
| 70° C. | 750 | 800 | 850 | 750 | 800 |
| Set (percent) at— | | | | | |
| 25° C. | 15 | 6 | 7 | 10 | 10 |
| 70° C. | 45 | 40 | 38 | 40 | 40 |

It will be noted from the above data that the differences in tensile strength at room temperature are relatively small. However, the tensile properties at elevated temperatures of all four of the block copolymers condensed by means of diethyl adipate are distinctly better than those of the material coupled with dibromoethane. Furthermore, it is obvious that neither the variation in diethyl adipate concentration nor the reaction temperature selected have produced a noticeable effect on the stress-strain properties.

In another type of comparison, the dibromoethane coupled product and the first product condensed by means of diethyl adipate were tested for their stress-relaxation behavior as a function of temperature. The data indicated that the critical temperature (the temperature at which an abrupt change in relaxation time is observed) was increased from 67° C. for the dibromoethane coupled product to 75° C.; for the diethyl adipate condensed product. This higher critical temperature of the latter results in better dimensional stability in range of actual service temperatures.

EXAMPLE III

Two other esters were tested as coupling agents, utilizing the lithium-terminated polystyrene-polybutadiene starting polymer employed in Example I. The results are indicated below:

TABLE III

| Ester | Equiv- alents, ester/ RLi | °C. | Time (min- utes) | Product | |
|---|---|---|---|---|---|
| | | | | (SB) | (SB)₃₋₄ |
| Dimethyl itaconate | 2.0 | 25 | 60 | 25 | 75 |
| Do | 2.0 | 60 | 60 | 19 | 81 |
| Diethyl oxalate | 2.0 | 60 | 60 | 28 | 72 |

We claim as our invention:

1. A method of making a branched polymer composition predominating in species having at least three times the average molecular weight of the starting polymer which comprises:
   (a) block polymerizing a monovinyl arene with a conjugated diene using an alkylmonolithium initiator and
   (b) reacting the resulting monolithium-terminated starting polymer in solution at 20–80° C. with from 1 to about 20 equivalents based on the lithium in the polymer of a diester of dicarboxylic acid and an aliphatic monohydric alcohol.

2. A method according to claim 1 wherein the starting polymer has the configuration polystyrene-polybutadiene-lithium.

3. A method according to claim 1 wherein the diester is an ester of an aliphatic dicarboxylic acid and an aliphatic monohydric alcohol.

4. A method according to claim 1 wherein the diester is an ester of an aromatic dicarboxylic acid and an aliphatic monohydric alcohol.

5. A process according to claim 1 wherein the lithium-terminated starting block copolymer has the configuration $$(A-B)_n Li$$

wherein A is a polymer block of a monovinyl arene, B is a polymer block of a conjugated diene and $n$ is a whole integer between 1 and 8, the condensed monovinyl arene content comprising 15–65% by weight of the polymer, each block A having an average molecular weight between about 7,500 and 50,000.

6. A method according to claim 3 where the diester is diethyl adipate.

7. A method according to claim 4 wherein the diester is diethyl terephthalate.

References Cited

UNITED STATES PATENTS

| 3,135,716 | 6/1964 | Uraneck et al. | 260—880 |
| 3,265,765 | 8/1966 | Holden et al. | 260—880 |
| 3,468,972 | 9/1969 | Hsieh | 260—880 |

JAMES A. SEIDLECK, Primary Examiner

U.S. Cl. X.R.

260—78.4, 879